United States Patent [19]

Dauphin et al.

[11] 4,208,462

[45] Jun. 17, 1980

[54] LAMINATED STRUCTURE COMPRISING A LAYER OF FLUORINATED POLYMER

[75] Inventors: Rene Dauphin, Rixensart; Nestor Maquet, Waha, both of Belgium

[73] Assignee: Solvay & Cie., Brussels, Belgium

[21] Appl. No.: 37,728

[22] Filed: May 10, 1979

[30] Foreign Application Priority Data

May 11, 1978 [FR] France ............................. 78 14517

[51] Int. Cl.² ..................... B32B 27/00; B32B 27/04; B32B 27/12
[52] U.S. Cl. ................................. 428/265; 428/267; 428/289; 428/290; 428/421
[58] Field of Search ............... 428/245, 253, 254, 255, 428/260, 262, 265, 267, 287, 289, 290, 296, 421

[56] References Cited

U.S. PATENT DOCUMENTS

| | | | |
|---|---|---|---|
| 3,318,850 | 5/1967 | Stitman | 428/421 |
| 3,826,774 | 7/1974 | Demillecamps et al. | 260/41 B |
| 3,922,186 | 11/1975 | Segawa et al. | 428/421 |
| 4,068,034 | 1/1978 | Segawa et al. | 428/421 |
| 4,141,873 | 2/1979 | Dohany | 428/421 |

FOREIGN PATENT DOCUMENTS

| | | | |
|---|---|---|---|
| 848958 | 4/1977 | Belgium. | |
| 2240955 | 3/1973 | Fed. Rep. of Germany | 428/421 |
| 2357883 | 5/1974 | Fed. Rep. of Germany | 428/421 |
| 51-41779 | 4/1976 | Japan | 428/421 |
| 1052949 | 12/1966 | United Kingdom. | |

*Primary Examiner*—James J. Bell
*Attorney, Agent, or Firm*—Spencer & Kaye

[57] ABSTRACT

A laminated structure which comprises a layer of polyvinylidene fluoride and a fabric which is hot-pressed onto this layer, wherein the fabric has synthetic fibres produced from a polymer which contains polar groups.

20 Claims, No Drawings

LAMINATED STRUCTURE COMPRISING A LAYER OF FLUORINATED POLYMER

The present invention relates to laminated structures comprising a layer of fluorinated thermoplastic polymer which exhibits a good adhesion to various substrates such as metals and plastics.

Coatings based on fluorinated thermoplastic polymers, and more particularly on polyvinylidene fluoride, are particularly suitable, by virtue of their great chemical inertness, for protecting various materials when the latter are required to be exposed to the action of corrosive ambient media. However, it has been found that it is difficult to obtain a sufficient adhesion between a coating based on polyvinylidene fluoride and a metal surface or a surface made of another plastic, for example a thermosetting polyester.

One known technique for improving the adhesion of these coatings consists in laminating a sheet of polyvinylidene fluoride beforehand, on one face which has been softened by heat, using a glass fibre fabric. The sticking onto the substrate to be protected is effected via the face provided with fabric, for example by means of a crosslinkable glue such as a glue of the epoxy type. However, it appears that the mechanical bond between the sheet of polyvinylidene fluoride and the glass fibre fabric is insufficient, in particular when the coating is subjected to thermal shocks.

In order to overcome this defect, it has already been proposed, in Belgian Pat. No. 848,958, filed on Dec. 1, 1976 in the name of PRODUITS CHIMIQUES UGINE KUHLMANN, to interpose a special adhesive, based on polyvinylidene fluoride, between the sheet of polyvinylidene fluoride and the glass fibre fabric before carrying out the hot lamination. This technique therefore requires an additional operation, namely the application of the adhesive. Moreover, it also does not make it possible to expect totally satisfactory results.

It has now been found that it is possible to produce a laminated structure comprising a layer of polyvinylidene fluoride and a fabric, in which structure the adhesion between the constituents is wholly satisfactory, and which moreover exhibits an excellent adhesion to various substrates.

The present invention therefore relates to a laminated structure comprising a layer of polyvinylidene fluoride and a fabric which is hot-pressed onto this layer, in which structure the fabric consists of synthetic fibres produced from a polymer containing polar groups.

Replacement of the conventional fabric based on glass fibres by a fabric of this kind in fact makes it possible to produce laminated structures in which the adhesion between the constituents is remarkable, without it being necessary to employ special adhesives. Moreover, the laminated structure according to the invention can be fixed, in a durable and totally satisfactory manner, to various substrates such as, for example, metal surfaces. It has even been found that this fixing can be ensured very effectively by means of contact adhesives in place of the adhesives of the crosslinkable type which are usually recommended for the previous structures comprising a glass fibre fabric.

Finally, the fabrics used according to the invention are more easily deformable than glass fibre fabrics. The laminated structure according to the invention can therefore easily be deformed by the action of heat and pressure, and it is thus possible to impart, to this structure, a shape which fits that of the substrate to be protected.

The polyvinylidene fluorides which can be used are both vinylidene fluoride homopolymers and vinylidene fluoride copolymers, provided the latter contain at least 50 mol % of units derived from vinylidene fluoride. The resin can obviously contain customary additives such as, for example, stabilizers, colorants, pigments, fillers, strengthening materials and the like. In particular, the resin can contain a high molecular weight compatible polyamide as described in Belgian Pat. No. 793,813, filed on Jan. 10, 1973 in the name of the Assignee of the present invention.

The polymer which contains polar groups and constitutes the fibres of the fabric can be of any type. Thus, it is possible to use an acrylic or vinyl resin, a polyamide resin or also a polyester resin. However, preference is given to polyamide resins and, in particular, to thermoplastic polyester resins, such as poly-(ethylene glycol) terephthalate, because the latter make it possible to expect better results from the point of view of adhesion. It is also preferred to use fabrics produced from fibres which have been subjected to a texturing treatment. The weight of the fabric is generally between 50 and 600 g/m$^2$ and preferably between 150 and 450 g/m$^2$.

The layer of vinylidene fluoride is combined with the fabric, consisting of fibres of a polymer containing polar groups, by hot pressing. This combining operation can be carried out, in particular, by pressing the constituents between the rolls of a calender. The pressing is carried out at a temperature between 170° and 300° C., and preferably between 180° and 240° C., under a pressure between 5 and 40 bars and preferably between 10 and 25 bars. According to a preferred procedure, a sheet of polyvinylidene fluoride, and optionally the fabric, are preheated before pressing so as to bring them into the temperature range specified above. According to another advantageous variant, the optionally preheated fabric is applied to a freshly extruded sheet of polyvinylidene fluoride and the whole is immediately directed between the rolls of a suitable calendering installation. Finally, it has been found that it is generally advantageous to preheat the fabric to a temperature which causes its constituent fibres to soften, especially if the fabric is to be deformed during the combining operation. Furthermore, it is very obvious that other techniques for combining by hot pressing, such as, for example, the techniques using fixed presses, are in no way excluded from the scope of the present invention.

As has been stated, the laminated structure according to the invention can be deformed by hot compression, and the sticking of the structure to various substrates by means of contact glues does not present any particular problem. The laminated structure according to the invention therefore proves of particular value for lining containers and other objects which are to withstand corrosive agents, such as, for example, vats or other equipment used in the chemical industry and other industries.

In particular, by virtue of its chemical inertness and is perfect harmlessness, the laminated structure according to the invention can be used for lining containers and other equipment used in the foodstuffs industries.

The laminated structure according to the invention is furthermore illustrated by the practical embodiments which now follow.

Example 1 is given by way of comparison and is excluded from the scope of the present invention.

EXAMPLE 1 (comparison example)

A 92151 glass fibre fabric, produced and marketed by the Société INTERGLAS and having a weight of 445 g/m$^2$, is applied by hot lamination of a 2 mm thick sheet of polyvinylidene fluoride (SOLEF X 10 N polymer produced and marketed by the Assignee of the present invention). The lamination temperature is 200° C. and the pressure exerted during this operation is 20 bars. After the laminated structure thus produced has been cooled to ambient temperature, it is subjected to a peel test. It is found that the force required to separate the two constituents is 3 kg/cm.

EXAMPLE 2

A 1403 polyamide fibre fabric, produced and marketed by the Société VEREINIGTE SEIDENWEBEREIEN A.G. and having a weight of 220 g/m$^2$, is applied by hot lamination to a polyvinylidene fluoride sheet which is identical to that of Example 1. The lamination temperature is 185° C. and the pressure exerted during this operation is 10 bars. After the laminated structure thus produced has been cooled to ambient temperature, it is subjected to a peel test which is identical to that of Example 1. It is found that the force required to separate the two constituents is 5.10 kg/cm.

EXAMPLE 3

A 1823 polyester fibre fabric, produced and marketed by the Société VEREINIGTE SEIDENWEBEREIEN A.G. and having a weight of 380 g/m$^2$, is applied by hot lamination to a polyvinylidene fluoride sheet which is identical to that of Example 1. The lamination temperature is 187° C. and the pressure exerted during this operation is 20 bars. After the structure thus produced has been cooled to ambient temperature, it is subjected to a peel test which is identical to that of Example 1. It is found that the force required to separate the two constituents is 9.70 kg/cm.

EXAMPLE 4

The procedure of Example 3 is followed, except that the lamination temperature is 200° C. and the pressure exerted during this operation is 10 bars. After the laminated structure thus produced has been cooled to ambient temperature, it is subjected to a peel test which is identical to that of Example 1. It is found that the force required to separate the two constituents is 7.10 kg/cm.

Examples 2 to 4 clearly show that the adhesion obtained by the hot lamination of a sheet of polyvinylidene fluoride with a fabric consisting of fibres prepared from a polymer which contains polar groups is distinctly superior to that obtained by the hot lamination of a sheet of polyvinylidene fluoride with a glass fibre fabric.

EXAMPLE 5

Laminated structures obtained in accordance with Examples 1, 2 and 4 are applied to sheets of sand-blasted steel, using, as the adhesive, either a contact adhesive (HENKEL 602 glue based on polychlorobutadiene and produced and marketed by HENKEL und Cie GmbH) or a crosslinkable adhesive (AV 138: epoxide glue produced and marketed by CIBA-GEIGY AG.).

These combinations are then subjected to an identical shear strength test at ambient temperature for the purpose of separating the laminated structures from their metal support.

The results of these tests are recorded in the table below.

TABLE

| Laminated structure according to | Shear strength kg/cm$^2$ | |
| --- | --- | --- |
| | HENKEL 602 adhesive | AV 138 adhesive |
| Example 1 | 15 | 23.8 |
| Example 2 | 30.5 | 43.2 |
| Example 4 | 27.2 | 24.6 |

Examination of this table shows that the laminated structures according to the invention, which have been stuck by means of a contact adhesive, adhere more strongly to the metal than the conventional structures (sheet of polyvinylidene fluoride/glass fibre fabric) which have been stuck by means of a crosslinkable adhesive.

Furthermore, the examples show the excellent behaviour of the polyester fabrics in the laminated structures according to the invention.

We claim:

1. A laminated structure comprising a layer of polyvinylidene fluoride and a fabric which is hot-pressed onto this layer, wherein said fabric comprises synthetic fibres produced from a polymer which contains polar groups.

2. A laminated structure according to claim 1, wherein said polyvinylidene fluoride is a vinylidene fluoride homopolymer.

3. A laminated structure according to claim 1, wherein said polyvinylidene fluoride is a copolymer containing at least 50 mol % of units derived from vinylidene fluoride.

4. A laminated structure according to claim 1, wherein said fabric comprises polyamide fibres.

5. A laminated structure according to claim 2, wherein said fabric comprises polyamide fibres.

6. A laminated structure according to claim 3, wherein said fabric comprises polyamide fibres.

7. A laminated structure according to claim 1, wherein said fabric comprises thermoplastic polyester fibres.

8. A laminated structure according to claim 2, wherein said fabric comprises thermoplastic polyester fibres.

9. A laminated structure according to claim 3, wherein said fabric comprises thermoplastic polyester fibres.

10. A laminated structure according to claim 1, wherein said fabric has a weight of between 50 and 600 g/m$^2$.

11. A laminated structure according to claim 2, wherein said fabric has a weight of between 50 and 600 g/m$^2$.

12. A laminated structure according to claim 3, wherein said fabric has a weight of between 50 and 600 g/m$^2$.

13. A laminated structure according to claim 4, wherein said fabric has a weight of between 50 and 600 g/m$^2$.

14. A laminated structure according to claim 7, wherein said fabric has a weight of between 50 and 600 g/m$^2$.

15. A laminated structure according to claim 1, wherein said synthetic fibres are textured.

16. A laminated structure according to claim 2, wherein said synthetic fibres are textured.

17. A laminated structure according to claim 3, wherein said synthetic fibres are textured.

18. A laminated structure according to claim 4, wherein said synthetic fibres are textured.

19. A laminated structure according to claim 7, wherein said synthetic fibres are textured.

20. A laminated structure according to claim 10, wherein said synthetic fibres are textured.

* * * * *